(12) United States Patent
Cotlear De Witzmann et al.

(10) Patent No.: US 7,611,774 B2
(45) Date of Patent: Nov. 3, 2009

(54) GLASS CERAMIC OR GLASS ELEMENT THAT CAN BE SUBJECTED TO GREAT THERMAL LOADS AND IS DECORATED WITH A METALLIC COLOR

(75) Inventors: Monica Cotlear De Witzmann, Nieder-Olm (DE); Dietmar Wennemann, Albig (DE); Angelina Milanovska, Mainz (DE); Ella Ruhl, Mainz (DE); Eva Lauterbach, Seibersbach (DE); Ioannis Kosmas, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 327 days.

(21) Appl. No.: 11/547,760

(22) PCT Filed: May 3, 2005

(86) PCT No.: PCT/EP2005/004776

§ 371 (c)(1),
(2), (4) Date: Oct. 5, 2006

(87) PCT Pub. No.: WO2005/108509

PCT Pub. Date: Nov. 17, 2005

(65) Prior Publication Data

US 2008/0214379 A1 Sep. 4, 2008

(30) Foreign Application Priority Data

May 6, 2004 (DE) .................. 10 2004 022 258

(51) Int. Cl.
*B32B 17/06* (2006.01)
*C03C 8/02* (2006.01)
*C03C 8/14* (2006.01)

(52) U.S. Cl. .................. 428/432; 428/402; 428/403; 428/701; 428/702; 501/66; 501/67; 501/69; 501/70; 501/21; 501/25; 501/26

(58) Field of Classification Search .................. None
See application file for complete search history.

(56) References Cited

U.S. PATENT DOCUMENTS

| | | | |
|---|---|---|---|
| 5,482,387 A | 1/1996 | Tanuma et al. | |
| 5,702,519 A | 12/1997 | Nitta et al. | |
| 5,716,712 A | 2/1998 | Schoenig et al. | |
| 6,043,171 A | 3/2000 | Siebers et al. | |
| 6,299,940 B1 | 10/2001 | Rapp et al. | |
| 6,517,943 B1 | 2/2003 | Beunet et al. | |
| 7,380,415 B2 | 6/2008 | Cotlear De Witzmann | |
| 2002/0084263 A1 | 7/2002 | Wennemann et al. | |
| 2003/0008774 A1* | 1/2003 | Yasuda et al. .................. 503/201 |
| 2003/0019864 A1 | 1/2003 | Krause et al. | |
| 2004/0091718 A1 | 5/2004 | Striegler | |
| 2005/0129959 A1 | 6/2005 | Roemer-Scheuermann et al. | |
| 2008/0139375 A1 | 6/2008 | Wennemann et al. | |

FOREIGN PATENT DOCUMENTS

| | | |
|---|---|---|
| DE | 34 33 880 | 3/1986 |
| DE | 42 01 286 | 7/1993 |
| DE | 44 26 234 | 3/1996 |
| DE | 297 11 916 | 8/1997 |
| DE | 197 28 881 | 9/1998 |
| DE | 197 21 737 | 11/1998 |
| DE | 198 56 171 | 6/1999 |
| DE | 198 34 801 | 2/2000 |
| DE | 198 59 420 | 6/2000 |
| DE | 200 19 210 | 1/2001 |
| DE | 100 14 373 | 10/2001 |
| DE | 696 13 642 | 5/2002 |
| DE | 102 43 500 | 4/2004 |
| DE | 103 38 165 | 3/2005 |
| DE | 103 55 160 | 6/2005 |
| DE | 10 2005 024 556 | 12/2006 |
| EP | 0 460 863 | 12/1991 |
| EP | 0 601 34 | 6/1994 |
| EP | 0 693 464 | 2/1995 |
| EP | 1 119 524 | 8/2001 |
| FR | 2 732 960 | 10/1996 |
| GB | 2 263 478 | 7/1993 |

OTHER PUBLICATIONS

Certificate of Analysis 1.04217.1000 Iriodin 302 Goldsatin, Mar. 4, 2003 (With Eng. Translation).
Certificate of Analysis 1.04646.1000 Iriodin 305 Solar Gold, Feb. 26, 2003 (With Eng. Translation).
Technical Data Sheet 6967 Iriodin 153 Luminescent Pearl, Jul. 2002 (With Certified Eng. Translation).
Certificate of Analysis 1.04959.1000 Iriodin 323 Royal Goldsatin, Oct. 8, 2002 (With Certified Eng. Translation).
Certificate of Analysis 1.04246.1000 Iriodin 103 Rutile Sterling Silver, Mar. 4, 2003 (With Certified Eng. Translation).
Certificate of Analysis 1.04959.1000 Iriodin 119 Polar White, Oct. 8, 2002 (With Certified Ebg. Translation).
Technical Data Sheet T60-24 SW Stellar Green, Jan. 2002 (With Certified Eng. Translation).
Technical Data Sheet T60-23 SW Galaxy Blue, Jan. 2002 (With Cert. Eng. Translation).

(Continued)

*Primary Examiner*—Ling Xu
(74) *Attorney, Agent, or Firm*—Michael J. Striker

(57) ABSTRACT

The glass ceramic or glass element that can be subjected to high thermal loads is decorated with a metallic colorant. The metallic colorant consists of a melted silicate and at least one effect pigment, which is included in a specified proportion in a melt of the silicate glass to form the metallic colorant. The at least one effect pigment is in the form of platelets of synthetic aluminum oxide ($Al_2O_3$) coated with at least one metal oxide. Preferably the at least one effect pigment is a XIRALLIC® high chroma sparkle pigment supplied commercially by Merck and the metallic colorant has a pigment content of from 1 to 30 wt. %.

14 Claims, No Drawings

OTHER PUBLICATIONS

Technical Data Sheet T60-21 SW Solaris Red, Oct. 2002 (With Certified Eng. Translation).
Technical Data Sheet F60-51 SW Radiant Red, Oct. 2002 (With Certified Eng. Translation.).
Technical Data Sheet T60-20 SW Sunbeam Gold, Oct. 2002 (With Certified Eng. Translation).
Technicla Data F60-50SW Fireside Copper, Oct. 2002 (With Certified Eng. Translation).
Technical Data Sheet T50-10 Crystal Silver, Jul. 2002 (With Certified Eng. Translation).

* cited by examiner

GLASS CERAMIC OR GLASS ELEMENT THAT CAN BE SUBJECTED TO GREAT THERMAL LOADS AND IS DECORATED WITH A METALLIC COLOR

CROSS-REFERENCE

This is the U.S. National Stage of PCT/EP 2005/004776, filed on May 3, 2005, which claims priority based on 10 2004 022 258.4, filed May 6, 2004 in Germany.

BACKGROUND OF THE INVENTION

1. The Field of the Invention

The invention relates to a glass ceramic or glass element that can be subjected to high thermal loads and is decorated with a metallic color based on melted silicate to which effect pigments have been added.

2. Related Art

Such colorants based on a silicate melt are typically ceramic colorants with molten glass as a base. They are baked onto the substrate at a high temperature.

When so-called effect pigments, special metal effect or pearlescent pigments are used as the pigments, the corresponding metallic colors can be prepared. Various pearlescent pigments comprising mica platelets coated with inorganic oxides, such as $TiO_2$, $SnO_2$ and $Fe_2O_3$, are commercially available, for example, under the name IRIODIN® (Merck).

Glass ceramics or glass elements decorated with the aforesaid metallic colors are made, in particular, as glass ceramic plates or plates consisting of tempered special glass with a low thermal expansion coefficient, such as borosilicate glass, and are used typically for cooking surfaces in cooking areas, namely for applications in which the plates are subjected to high thermal loads. However, fireplace sight glasses, baking oven sight glasses and lamp covers made of these materials, for example, are also increasingly being decorated with the aforesaid colors.

Because, in particular, cooking surfaces in cooking areas of modern kitchens are conspicuous because of their large surface area and decisively influence the design which is markedly customer-dependent and differs from country to country, the most varied decorations are described in numerous publications. They range from simple patterns, for example company logos or cooking area markings, to complex full-surface decorations. Important besides the design is, in particular, the protection against surface scratches and the reduction in susceptibility to soiling, for example to finger prints and metal particles produced by abrasion as well as to marks resulting from use. Such decorations and their application to a glass ceramic plate are described, for example, in DE 44 26 234 C1 (=EP 0 693 464 B1) and DE 34 33 880 C2. Other decorated cooking surfaces are disclosed in DE 197 28 881 C1 (=DE 297 11 916 U1), DE 100 14 373 C2 and DE 200 19 210 U1. The last two publications also describe decorations with sol-gel-based colorants containing metal effect, pearlescent or interference pigments, namely effect pigments producing a metallic effect in the color. Such molten glass-based colorants, namely ceramic metallic colorants containing such pigments are also known from the prior art.

In certain market segments, and especially for adaptation to aluminum and stainless steel surfaces in modem kitchens, decorated glass/glass ceramic cooking surfaces with a metallic effect occupy an important position. The previously used effect pigments, however, are not fully satisfactory from the standpoint of the intensity of the metallic effect and the reduction in susceptibility to marks resulting from use.

SUMMARY OF THE INVENTION

Hence, an object of the present invention is to decorate a glass ceramic or glass element that can be subjected to high thermal loads with a metallic colorant based on melted silicate and containing effect pigments that produce a highly pronounced metallic effect.

This object and others, which will be made more apparent hereinafter, are attained in a glass ceramic or glass element that can be subjected to high thermal loads and is decorated with a metallic colorant.

According to the invention the metallic colorant consists of melted silicate and at least one effect pigment, wherein said at least one effect pigment is included in a specified proportion in a melt of the silicate in order to form the metallic colorant and wherein said at least one effect pigment is in the form of platelets of synthetic aluminum oxide ($Al_2O_3$) coated with at least one metal oxide.

Although these effect pigments are in themselves known, it was not obvious to use them in colorants based on a silicate melt, because they are not common in this industry and because their heat resistance as given by their manufacturers is not sufficient for use in such colorants with a silicate melt as base (stable up to 230° C. according to the manufacturer's Technical Data Sheets dated October 2002 and January 2003). According to product information supplied by the manufacturer Merck, these pigments are therefore always used in organic matrices, for example in automobile manufacture, in plastics, in printing inks and in lacquers. For this reason, it was not immediately obvious that these pigments could be used for decorating glass ceramic and glass elements that are subjected to high thermal loads. Surprisingly, we have found that by adding the aforesaid pigments to the silicate melt, particularly to molten glass, in a manner in which they are usually employed for decorating glass ceramics and special glasses, heat resistance can be increased to such an extent that an entirely new field of application opens up for them.

Moreover, decorated glass ceramic cooking surfaces are given the practical advantage that metal scratches usually caused by moving cookware become inconspicuous because they are covered by the pronounced metallic effect of these colors.

Preferred effect pigments are those commercially supplied by Merck under the tradename XIRALLIC®. XIRALLIC® high chroma sparkle pigments supplied commercially by Merck are especially preferred. These pigments impart a stronger metallic effect than any other known effect pigments. They produce a stronger luster and a more intense color strength. A pigment with a narrow particle size distribution has a particle size in the 10-30 μm range.

Various pigments are available depending on the desired hue, for example:

a) for the color: copper
    XIRALLIC® F 60-50 SW
    Fireside Copper

This metallic effect pigment, XIRALLIC® F 60-50 SW, has a composition comprising from 56 to 66 wt. % of $Al_2O_3$ and from 34 to 44 wt. % of $Fe_2O_3$ and is a copper-colored free-flowing powder comprising particles of which 80% have a particle size of 5 to 30 μm.

b) for the color: gold
    XIRALLIC® T 60-20 SW
    Sunbeam Gold

This metallic effect pigment, XIRALLIC® T 60-20 SW, has a composition comprising from 64 to 75 wt. % of $Al_2O_3$, from 25 to 35 wt. % of $TiO_2$ and from 0 to 1 wt. % of $SnO_2$ and is a yellow free-flowing powder comprising particles of which 80% have a particle size of 5 to 30 μm.

c) for the color: silver-white
XIRALLIC® T 60-10 SW
Crystal silver

This metal effect pigment, XIRALLIC® T 60-10 SW, has a composition comprising from 70.5 to 78.5 wt. % of $Al_2O_3$, from 21.0 to 28.0 wt. % of $TiO_2$ and from 0.5 to 1.5 wt. % of $SnO_2$ and is a silver-white free-flowing powder comprising particles of which 90% have a particle size of 5 to 40 μm.

d) for the color: red
XIRALLIC® F 60-51 SW
Radiant Red

This metal effect pigment, XIRALLIC® F 60-51 SW, has a composition comprising from 53 to 63 wt. % of $Al_2O_3$ and from 37 to 47 wt. % of $Fe_2O_3$ and is a red free-flowing powder comprising particles of which 80% have a particle size of 5to 30 μm.

Other suitable pigments are indicated in the subclaims. These additional suitable pigments include XIRALLIC® T 60-24 SW Stellar Green, which has a composition comprising from 35 to 46 wt. % of $Al_2O_3$, from 54 to 64 wt. % of $TiO_2$ and from 0 to 1 wt. % of $SnO_2$ and is a green free-flowing powder in which 80% of the particles have a particle size of 5 to 30 μm; XIRALLIC® T 60-23 SW Galaxy Blue, which has a composition comprising from 53 to 64 wt. % of $Al_2O_3$, from 36 to 46 wt. % of $TiO_2$ and from 0 to 1 wt. % of $SnO_2$ and is a blue free-flowing powder in which 80% of the particles have a particle size of 5 to 30 μm; and XIRALLIC® T 60-21 SW Solaris Red, which has a composition comprising from 59 to 70 wt. % of $Al_2O_3$, from 38 to 40 wt. % of $TiO_2$ and from 0 to 1 wt. % of $SnO_2$ and is a red free-flowing powder in which 80% of the particles have a particle size of 5 to 30 μm.

Preferably, the base of the colorant with the effect pigments of the invention is a molten glass.

The molten glass preferably has the following composition (in wt. %):

| | |
|---|---|
| $Li_2O$ | 0-5 |
| $Na_2O$ | 0-5 |
| $K_2O$ | <2 |
| $\Sigma Li_2O + Na_2O + K_2O$ | 1-10 |
| MgO | 0-3 |
| CaO | 0-4 |
| SrO | 0-4 |
| BaO | 0-4 |
| ZnO | 0-4 |
| $B_2O_3$ | 15-27 |
| $Al_2O_3$ | 10-20 |
| $SiO_2$ | 43-58 |
| $TiO_2$ | 0-3 |
| $ZrO_2$ | 0-4 |
| $Sb_2O_3$ | 0-2 |
| F | 0-3 |

This composition of the molten glass—in the following referred to as "GF1"—is the same as that indicated in DE 197 21 737 C1, the disclosures of which are taken into account in the present application by this reference. Depending on the application, other usable glass compositions are described in DE 198 34 801 C2, FR 2 732 960, EP 1 119 524 B1, DE 42 01 286 A1 and EP 0 460 863 B1.

Besides the effect pigments added to the molten glass according to the invention, common fillers and/or other conventional colored pigments, for example colored substances (spinels), can optionally also be added.

Preferably the metallic colorant has a pigment content of from 1 to 30 wt. %.

The decoration is preferably done by screen printing, particularly in the case of glass/-glass ceramic cooking surfaces. In this case, unusual difficulties concerning the fabrication technique had to be overcome. In particular, the paste preparation/adjustment to the correct viscosity and the particle size of the pigments for screen printing use presented problems. In this sense, the prior art offered no assistance, because the effect pigments to be used, dissolved in organic solvents, are typically applied by spraying, especially in the case of automotive lacquers.

The thickness of the decoration according to the invention is typically in the 1.0-6 μm range.

PRACTICAL EXAMPLES

1. Molten "GF1" glass (as per DE 197 21 737 C)+20% of effect pigment XIRALLIC® T 60-20 SW Sunbeam Gold, high chroma crystal sparkle pigment, made into a paste with the screen printing medium and then printed onto glasses/glass ceramics that became known as products having the following tradenames:
a) CERAN HIGHTRANS® cooking surfaces
b) CERAN SUPREMA® cooking surfaces
c) ROBAX® fireplace sight glasses
d) CERAN ARCTIC FIRE® cooking surfaces
e) CERADUR® cooking surfaces always produces an intense brass color with various yellowish-reddish hues depending on the background color of the substrate, namely
on CERAN HIGHTRANS® and CERAN SUPREMA® an intense brass color with yellowish-reddish hues,
on transparent glass ceramics (for example ROBAX®) a transparent delustering with a "brass tinge" that depends on the angle of view,
on white translucent (for example ARCTIC FIRE®) and opaque (for example CERADUR®) glass ceramic the impression of "silk white" color with a "brass tinge" that depends on the angle of view.

2. Molten "GF1" glass+20% of effect pigment XIRALLIC® F 60-51 SW Radiant Red high chroma crystal sparkle pigment, made into a paste with the screen printing medium and then printed on the same substrates as in the first example. This composition in all cases gave an intense metallic copper color with varying color intensities, depending on the background color of the substrate, namely:
on CERAN HIGHTRANS® and CERAN SUPREMA® an intense copper color with reddish hues,
on transparent glass ceramic (for example ROBAX®) a transparent delustering with a "copper tinge" that depends on the angle of view,
on white translucent (for example ARCTIC FIRE®) and opaque (for example CERADUR®) glass ceramic the impression of a "silk white" color with a "copper tinge" that depends on the angle of view.

CERAN HIGHTRANS® glass ceramics are black in the melt and have the following composition, in weight percent on an oxide basis:

| | |
|---|---|
| $SiO_2$ | 62-68 |
| $Al_2O_3$ | 19.5-22.5 |
| $Li_2O$ | 3.0-4.0 |
| $Na_2O$ | 0.0-1.0 |
| $K_2O$ | 0.0-1.0 |
| BaO | 1.5-3.5 |
| CaO | 0.0-1.0 |

-continued

| | |
|---|---|
| MgO | 0.0-0.5 |
| ZnO | 0.5-2.5 |
| $TiO_2$ | 1.5-5.0 |
| $ZrO_2$ | 0.0-3.0 |
| $MnO_2$ | 0.0-0.40 |
| $Fe_2O_3$ | 0.0-0.20 |
| CuO | 0.0-0.30 |
| NiO | 0.0-0.30 |
| $V_2O_5$ | 0.0-0.80 |
| $Cr_2O_3$ | 0.0-0.20 |
| F | 0.0-0.20 |
| $Sb_2O_3$ | 0.0-2.0 |
| $As_2O_3$ | 0.0-2.0 |
| $\Sigma\ Na_2O + K_2O$ | 0.5-1.5 |
| $\Sigma\ BaO + CaO$ | 1.5-4.0 |
| $\Sigma\ TiO_2 + ZrO_2$ | 3.5-5.5 |
| $\Sigma\ Sb_2O_3 + As_2O_3$ | 0.5-2.5. |

CERAN SUPREMA® glass ceramics are black with a composition, in weight percent on an oxide basis, comprising:

| | |
|---|---|
| $SiO_2$ | 52-75 |
| $Al_2O_3$ | 18-27 |
| $Li_2O$ | 2.5-5.5 |
| $Na_2O$ | 0.0-3.0 |
| $K_2O$ | 0.0-3.0 |
| BaO | 0.0-3.5 |
| CaO | 0.0-2.5 |
| MgO | 0.0-3.0 |
| ZnO | 0.0-3.5 |
| $TiO_2$ | 1.2-5.5 |
| $ZrO_2$ | 0.0-3.0 |
| $SnO_2$ | <1.0 |
| $P_2O_5$ | 0.0-8.0 |
| $V_2O_5$ | 0.02-0.6 |
| $\Sigma\ Na_2O + K_2O$ | 0.0-4.0 |
| $\Sigma\ TiO_2 + ZrO_2 + SnO_2$ | 2.0-6.0, | plus optional coloring ingredients, such as Cr, Mn, Fe, Co, Ni, Se, and Cl compounds in order to adjust the color shade of these glass ceramics.

Keatite glass ceramics, such as CERAN ARCTIC FIRE® and CERADUR®, can be obtained by heat treating glass ceramics containing high quartz mixed crystals, such as the above-described CERAN® HIGHTRANS glass ceramics, at high temperatures.

ROBAX® fireplace sight glass has a very small thermal expansion coefficient and a composition, in weight percent on an oxide basis, comprising:

| | |
|---|---|
| $SiO_2$ | 35-70 |
| $Al_2O_3$ | 17-32 |
| $Li_2O$ | 2-10 |
| $Na_2O$ | 0-1 |
| $K_2O$ | 0-1 |
| ZnO | 0-5 |
| $TiO_2$ | 0-6 |
| $ZrO_2$ | 0-3 |
| $SnO_2$ | 0-3 |
| $P_2O_5$ | 0-17 |
| $Sb_2O_3$ | up to 1 |
| $As_2O_3$ | up to 1 |
| $\Sigma$ alkaline earth oxides | 0-4. |

The invention claimed is:

1. A glass ceramic or glass element that can be subjected to high thermal loads and is decorated with a metallic colorant; wherein said metallic colorant consists of melted silicate and at least one effect pigment, said at least one effect pigment being included in a specified proportion in a melt of said silicate to form said metallic colorant; and wherein said at least one effect pigment is in the form of platelets of synthetic aluminum oxide ($Al_2O_3$) coated with at least one metal oxide.

2. The glass ceramic or glass element as defined in claim 1, wherein said silicate is a glass that has a composition, in wt. %, of:

| | |
|---|---|
| $Li_2O$ | 0-5 |
| $Na_2O$ | 0-5 |
| $K_2O$ | <2 |
| $\Sigma Li_2O + Na_2O + K_2O$ | 1-10 |
| MgO | 0-3 |
| CaO | 0-4 |
| SrO | 0-4 |
| BaO | 0-4 |
| ZnO | 0-4 |
| $B_2O_3$ | 15-27 |
| $Al_2O_3$ | 10-20 |
| $SiO_2$ | 43-58 |
| $TiO_2$ | 0-3 |
| $ZrO_2$ | 0-4 |
| $Sb_2O_3$ | 0-2 |
| F | 0-3. |

3. The glass ceramic or glass element as defined in claim 1, wherein said metallic colorant comprises at least one filler.

4. The glass ceramic or glass element as defined in claim 1, wherein said metallic colorant comprises additional colored pigments.

5. The glass ceramic or glass element as defined in claim 1, wherein the metallic colorant has a pigment content of from 1 to 30 wt. %.

6. The glass ceramic or glass element as defined in claim 1, wherein said metallic colorant is applied by screen printing to form a decoration on a surface of the glass ceramic or glass ceramic element.

7. The glass ceramic or glass element as defined in claim 6, wherein the surface is on a topside of the glass ceramic or glass element and the decoration provides a cooking surface in a cooking area on the glass ceramic or glass element.

8. The glass ceramic or glass element as defined in claim 1, wherein said at least one effect pigment has a composition comprising from 70.5 to 78.5 wt. % of $Al_2O_3$, from 21.0 to 28.0 wt. % of $TiO_2$ and from 0.5 to 1.5 wt. % of $SnO_2$ and is a silver-white free-flowing powder comprising particles of which 90% have a particle size of 5 to 40 μm.

9. The glass ceramic or glass element as defined in claim 1, wherein said at least one effect pigment has a composition comprising from 56 to 66 wt. % of $Al_2O_3$ and from 34 to 44 wt. % of $Fe_2O_3$ and is a copper-colored free-flowing powder comprising particles of which 80% have a particle size of 5 to 30 μm.

10. The glass ceramic or glass element as defined in claim 1, wherein said at least one effect pigment has a composition comprising from 64 to 75 wt. % of $Al_2O_3$, from 25 to 35 wt. % of $TiO_2$ and from 0 to 1 wt. % of $SnO_2$ and is a yellow free-flowing powder comprising particles of which 80% have a particle size of 5 to 30 μm.

11. The glass ceramic or glass element as defined in claim 1, wherein said at least one effect pigment has a composition comprising from 53 to 63 wt. % of $Al_2O_3$ and from 37 to 47 wt. % of $Fe_2O_3$ and is a red free-flowing powder comprising particles of which 80% have a particle size of 5 to 30 μm.

12. The glass ceramic or glass element as defined in claim 1, wherein said at least one effect pigment has a composition comprising from 59 to 70 wt. % of $Al_2O_3$, from 38 to 40 wt. % of $TiO_2$ and from 0 to 1 wt. % of $SnO_2$ and is a red free-flowing powder comprising particles of which 80% have a particle size of 5 to 30 μm.

13. The glass ceramic or glass element as defined in claim 1, wherein said at least one effect pigment has a composition comprising from 53 to 64 wt. % of $Al_2O_3$, from 36 to 46 wt. % of $TiO_2$ and from 0 to 1 wt. % of $SnO_2$ and is a blue free-flowing powder comprising particles of which 80% have a particle size of 5 to 30 μm.

14. The glass ceramic or glass element as defined in claim 1, wherein said at least one effect pigment has a composition comprising from 35 to 46 wt. % of $Al_2O_3$, from 54 to 64 wt. % of $TiO_2$ and from 0 to 1 wt. % of $SnO_2$ and is a green free-flowing powder comprising particles of which 80% have a particle size of 5 to 30 μm.

* * * * *